US009661207B2

(12) United States Patent
Lytle

(10) Patent No.: US 9,661,207 B2
(45) Date of Patent: May 23, 2017

(54) FRONT-PIVOT, MOTORIZED PAN-TILT CAMERA

(71) Applicant: Craig Lytle, Los Altos Hills, CA (US)

(72) Inventor: Craig Lytle, Los Altos Hills, CA (US)

(73) Assignee: Craig Lytle, Los Altos Hills, CA (US)

( * ) Notice: Subject to any disclaimer, the term of this patent is extended or adjusted under 35 U.S.C. 154(b) by 69 days.

(21) Appl. No.: 14/548,543

(22) Filed: Nov. 20, 2014

(65) Prior Publication Data

US 2016/0150159 A1 May 26, 2016

(51) Int. Cl.
*H04N 5/228* (2006.01)
*H04N 5/225* (2006.01)
*H04N 5/232* (2006.01)

(52) U.S. Cl.
CPC ....... *H04N 5/23206* (2013.01); *H04N 5/2251* (2013.01); *H04N 5/232* (2013.01)

(58) Field of Classification Search
CPC .......... G09G 2320/068; H04N 5/2259; H04N 5/23216; H04N 1/32776; H04N 1/00307; H04N 1/00103; G08B 13/1963; G08B 13/19689; G08B 13/1966; G06F 2213/3814; G06F 1/1698
USPC ......... 348/143, 208.2, 208.4, 373, 374, 375, 348/376, 207.11, 208.3; 345/173
See application file for complete search history.

(56) References Cited

U.S. PATENT DOCUMENTS

| 5,538,212 A * | 7/1996 | Kennedy | G03B 17/561 248/215 |
|---|---|---|---|
| 2003/0030731 A1* | 2/2003 | Colby | H04N 1/00281 348/231.3 |
| 2003/0210346 A1* | 11/2003 | Hildreth | G08B 13/19619 348/373 |
| 2008/0099655 A1* | 5/2008 | Goodman | F16M 11/14 248/674 |
| 2012/0007998 A1* | 1/2012 | Mottur | H04N 5/23203 348/211.2 |
| 2012/0320151 A1* | 12/2012 | Unger | G08B 13/19628 348/37 |
| 2014/0140686 A1* | 5/2014 | Weihe | G03B 17/561 396/428 |
| 2015/0185591 A1* | 7/2015 | Jorgenson | G03B 17/561 396/428 |
| 2015/0212393 A1* | 7/2015 | Heilweil | G03B 17/561 396/427 |

* cited by examiner

*Primary Examiner* — Xi Wang
(74) *Attorney, Agent, or Firm* — Amin, Turocy & Watson LLP

(57) ABSTRACT

Various embodiments provide for a front-pivot, pan-tilt-zoom camera designed to fit into an opening formed in a chain-link fence to enable video recording and photography of activities through the narrow opening in the fence. In some embodiments, the camera can be mounted to the chain-link fence and allow remote operation of the motorized pan and tilt control as well as zoom, focus, exposure and other common camera features. The pan and tilt mechanism pivots the imaging device in the camera around an axis of rotation in front of the imaging device which allows the field of view of the imaging device to be changed while remaining inserted into the fence opening.

20 Claims, 13 Drawing Sheets

FRONT-PIVOT, MOTORIZED PAN-TILT CAMERA

TECHNICAL FIELD

The subject disclosure relates to a camera mounted on a chain-link fence that can be remote controlled via a mobile device.

BACKGROUND

Existing video and still cameras are typically optimized for use while being held by the user. Typically they include some kind of dedicated view finder to allow the user to aim the camera which generally required the user to be near the camera while shooting. This is sometimes inconvenient and limits the views and perspectives that can be captured at events such as school plays, weddings, or youth sports. A chain-link fence between the camera and the event can provide further complications, with the chain-link fence obstructing the view.

The above-described description is merely intended to provide a contextual overview of current techniques for providing remote controlled imaging devices and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a front-pivot motorized pan-tilt camera includes a camera device, surrounded by a bezel, configured to be inserted into an opening formed by a chain-link fence, wherein the bezel is in contact with the chain-link fence. The apparatus also includes a mounting assembly, affixed to the camera device, configured to attach to the chain-link fence using a plurality of straps, wherein the mounting assembly attaches to a side of the chain-link fence opposite a side of the chain-link fence associated with a field of view of an imaging device in the camera device. The apparatus can also include a pointing mechanism configured to pan and tilt the imaging device within the camera device so that the field of view can be adjusted, wherein the camera device remains stationary within the opening of the chain-link fence.

In another example embodiment, a method for operating a front-pivot motorized pan-tilt camera comprises receiving a control instruction from a mobile device for directional pointing and imaging device operation via a wireless antenna associated with a camera device that is inserted into an opening formed by a chain-link fence, wherein a sloped bezel around the camera device is in contact with the chain-link fence. The method also includes panning and tilting an imaging device housed within the camera device based on the control instruction, wherein the camera device remains stationary within the opening formed by the chain-link fence. The method further includes recording an image based on the control instruction and storing the image in a storage device housed in a mounting assembly coupled to the camera device, wherein the mounting assembly is affixed to the chain-link fence via a set of straps.

In another example embodiment, a front-pivot motorized pan-tilt camera system comprises a processor, and a memory that stores executable instructions that, when executed by the processor, facilitate performance of operations. The operations include receiving a control instruction from a mobile device for directional pointing and imaging device operation via a wireless antenna associated with a camera device that is inserted into an opening formed by a chain-link fence and held in place by a mounting assembly affixed to the chain-link fence via a set of straps, wherein a sloped bezel around the camera device is in contact with the chain-link fence. The operations also include panning and tilting an imaging device housed within the camera device based on the control instruction, wherein the camera device remains stationary within the opening formed by the chain-link fence. The operations further include recording an image based on the control instruction and storing the image in a storage device.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1A:
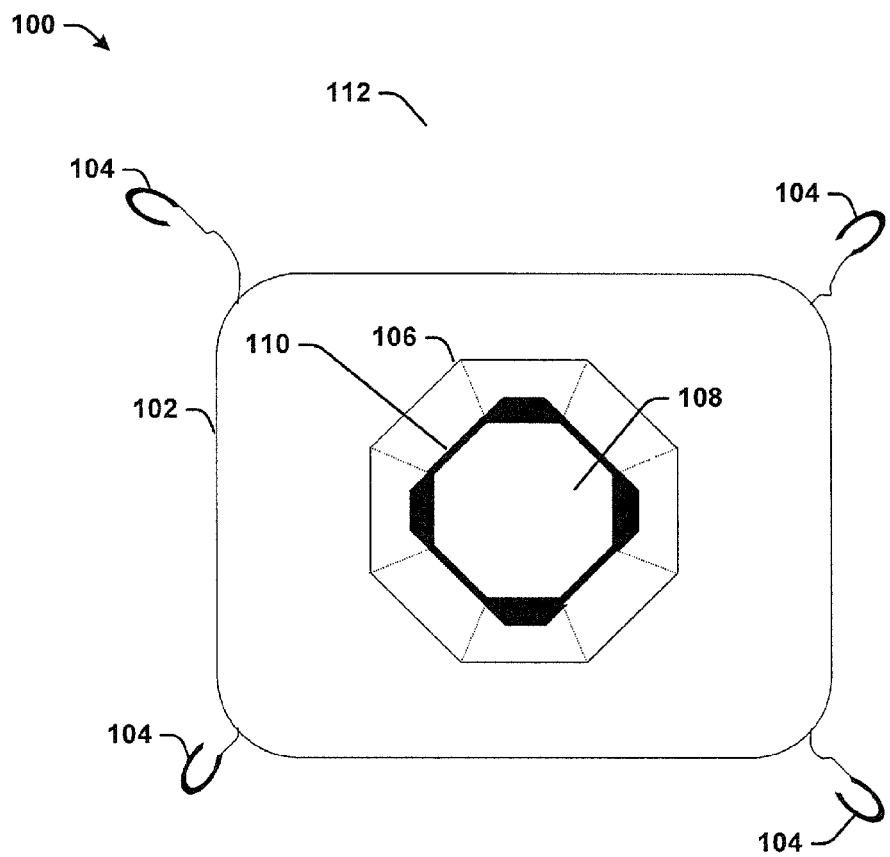
FIG. 1A is a block diagram illustrating an example, non-limiting embodiment of a front pivoting, motorized pan-tilt camera in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a front-pivot, pan-tilt-zoom camera designed to fit into an opening formed in a chain-link fence to enable video recording and photography of activities through the narrow opening in the fence. In some embodiments, the camera can be mounted to the chain-link fence and allow remote operation of the motorized pan and tilt control as well as zoom, focus, exposure and other common camera features. The pan and tilt mechanism pivots the imaging device in the camera around an axis of rotation in front of the imaging device which allows the field of view of the imaging device to be changed while remaining inserted into the fence opening.

The camera can include a mounting assembly that mounts to the chain-link fence using a set of straps and/or hooks. With the camera mounted to the chain-link fence, it is possible for the camera to be remotely controlled via a mobile device or other remote control unit. The camera can include motors that facilitate pan and tilt functionality, and a controller that operates the motors and the imaging device. The controller can control the motors and imaging device based on instructions received wirelessly from a mobile device. The camera can include one or more batteries that power the camera and also include memory for digital storage of the images recorded by the imaging device.

Turning now to the illustrations, FIG. 1A illustrates a block diagram of an example, non-limiting embodiment of a front pivoting, motorized pan-tilt camera in accordance with various aspects described herein. A camera 110 can be inserted into a hole or other opening in a chain-link fence 112 such that the camera 110 is held in place in the hole and the imaging device in the camera 110 can get a clear field of view without any portion of the chain-link fence the view. The imaging device can be rotated within the camera 110 so that the field of view can be adjusted while the camera 110 remains more or less stationary within the opening formed in the chain-link fence 112.

Figure 1B:
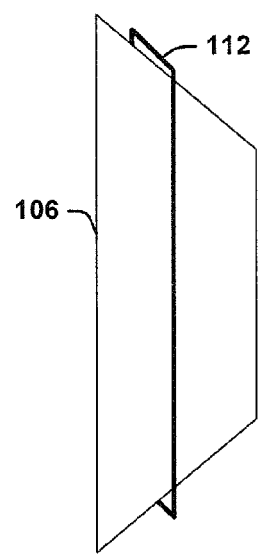
FIG. 1B is a block diagram illustrating an example, non-limiting embodiment of a front pivoting, motorized pan-tilt camera bezel in accordance with various aspects described herein.

A sloped bezel 106 can surround the camera 110 and provide a support or surface on which the chain-link fence 112 rests. A side view of the bezel 106 can be seen in FIG. 1B where it can clearly be seen that the bezel 106 is sloped.

As the camera 110 is inserted into the hole formed by the chain-link fence 112, the sloped bezel 106 will come into contact with the chain-link fence 112 thus limiting the insertion of the camera 110 into the hole. Due to the slope or angle of bezel 106, the camera can be inserted into a variety of different types of chain-link fences with different sizes of openings. In an embodiment, the shape of the bezel 106 can be octagonal allowing the camera 110 to be inserted into a variety of different shaped openings.

A front lens or glass shield 108 can protect the imaging device (shown in more details in FIGS. 2-7) inside the camera 110. The front lens 108 can be flat and can sit slightly recessed behind the leading edge of the bezel 106. The imaging device's lenses and associated electronics can sits behind the front lens 108.

A mounting assembly 102 can form a part of the camera 110 and can be used to mount the camera 110 to the chain-link fence 112. The mounting assembly 102 can include a set of straps and hooks 104 that attach to the chain-link fence 112 to keep the camera 110 flush with the fence and inserted into the opening. In an embodiment, the straps can be elastic to provide more flexibility in attaching the camera 110 to the chain-link fence 112.

In an embodiment, batteries and/or storage devices can be located on the mounting assembly 102 or within the central portion of the camera 110. A radio antenna can also be built into the camera 110 or the mounting assembly 102 that enables reception of control instructions from a mobile device or from other cameras. The camera 110 can also live stream photos or videos captured by the camera 110 to the mobile device or other device nearby. The camera 110 can perform video compression before streaming or transmitting the photographs or video in order to decrease the transmission bandwidth.

In an embodiment, the camera 110 can also perform image analytics on captured photographs and video. Through the use of video analytics, the camera 110 can identify relevant objects in the scene and make a decision about how to pan, tilt, zoom, and focus the imaging device to best capture the scene. Additionally the camera 110 can send meta-data about the analysis (e.g. object type, location, and velocity) to other cameras in the area through wireless or wired transmission. The camera 110 can also receive similar data from other cameras and use that data to improve its own analytics.

Figure 2:
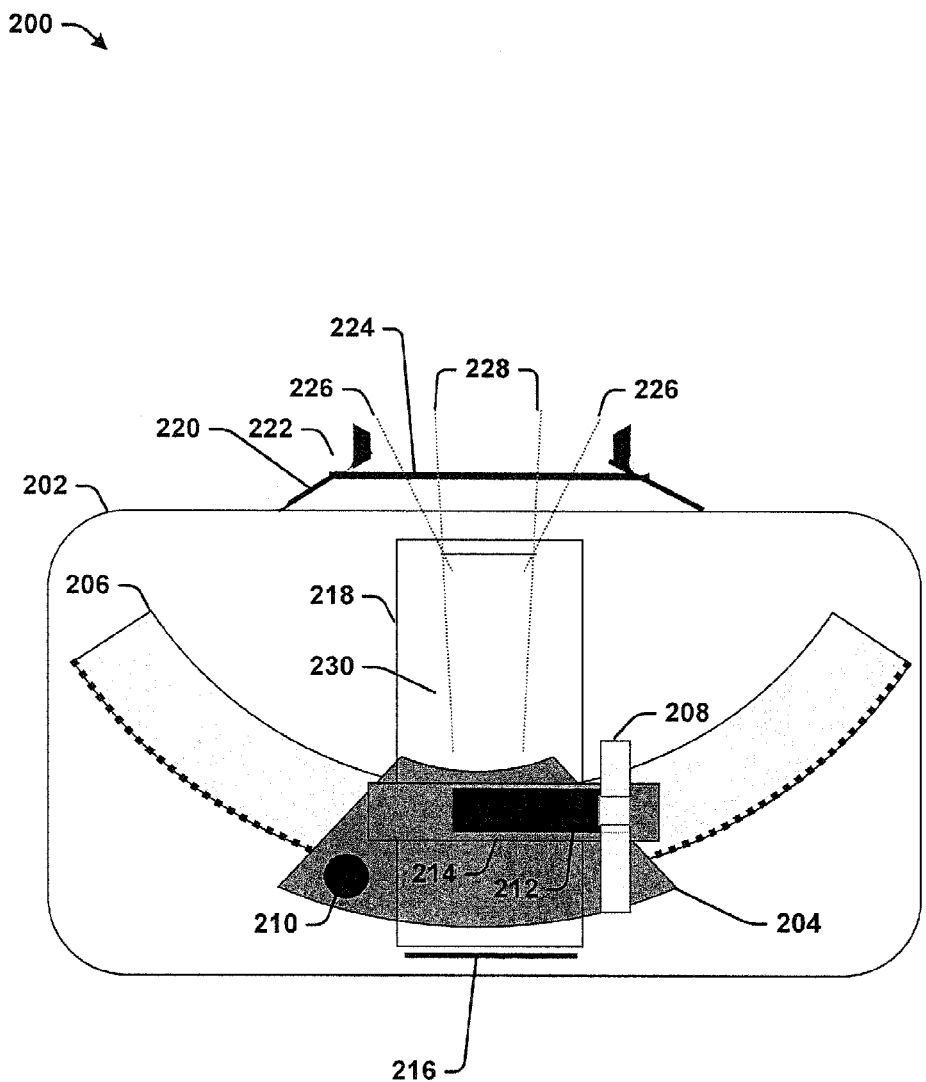
FIG. 2 is a block diagram illustrating an example, non-limiting embodiment of a pointing mechanism in a camera in accordance with various aspects described herein.

Turning now to FIG. 2, illustrated is an example, non-limiting embodiment 200 of a pointing mechanism in a camera 202 in accordance with various aspects described herein. The figure shown in FIG. 2 is shown from a top down perspective.

In an embodiment, the camera 202 can include a curved pan track 206 that provides guidance for the pan motion of the camera 202. The pan track 206 can be mounted to a bottom of the housing of the camera 202 and can be formed in the shape of a semicircle. As the base unit 204 moves along the pan track 206, the image sensor 216 can capture images with a different field of view.

The base unit 204 can surround the pan track 206 and/or move along the pan track 206 using wheels or cogs. The base unit 204 can include a motor 210 that propels the base unit 204 along the pan track 206. A curved tilt track 208 can also be included and a imaging device holder 214 can be propelled up and down on the tilt track 208 by electric motor 212. The imaging device 218 can include an image sensor 216 and a set of lenses 230 which can provide focus and zoom capabilities for the camera 202. In an embodiment, the tilt track 208 rises vertically within the camera housing, and provides for the tilt motion of the camera 202.

The dotted lines 228 represent the current field of view of the imaging device 218 while the dotted lines 226 represent the potential field of view of the imaging device 218 based on the position of the base unit along the pan track 206.

A front lens or glass covering 224 provides protection for the inside of the camera 202 and can also be part of the optical system that provides functionality for the focusing and zooming of the imaging device 218. The front lens or glass covering 224 can be slight recessed behind a leading edge of the bezel 220. The bezel 220 can be sloped and provide a surface upon which the chain-link fence 222 rests.

Figure 3:
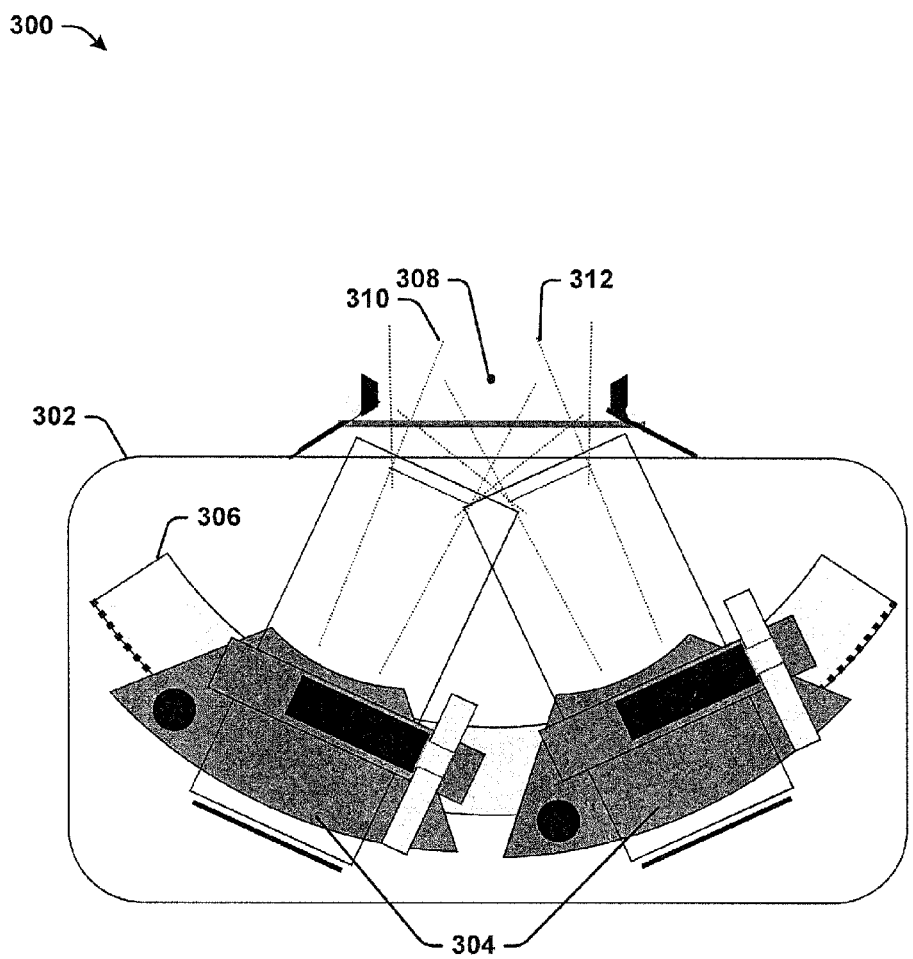
FIG. 3 is a block diagram illustrating another example, non-limiting embodiment of a pointing mechanism in operation in a camera in accordance with various aspects described herein.

Turning now to FIG. 3, illustrated is another example, non-limiting embodiment 300 of a pointing mechanism in operation in a camera 302 in accordance with various aspects described herein. FIG. 3 depicts camera 302 from the same top down perspective as shown in FIG. 2. In FIG. 3 the base unit 304 is shown in different positions at a different pan angle. The fields of view of the imaging device are shown by ray tracings 310 and 312, corresponding to the left position of the base unit 304 and the right position of the base unit 304 respectively.

The base unit 304 moves along track 306, such that the axis of rotation 308 is in front of the base imaging device. The axis of rotation 308 can be in different locations in different embodiments based on the curvature of the pan track 306 and the location of the pan track 306 in the camera 302. In some embodiments, the axis of rotation 308 can sometimes be within the camera 302 itself in some embodiments. In other embodiments, the curvature of the pan track 306 may not be an even semi-circle, and thus the axis of rotation 308 may be not be a point location but may trace out a non-point area.

Figure 4:
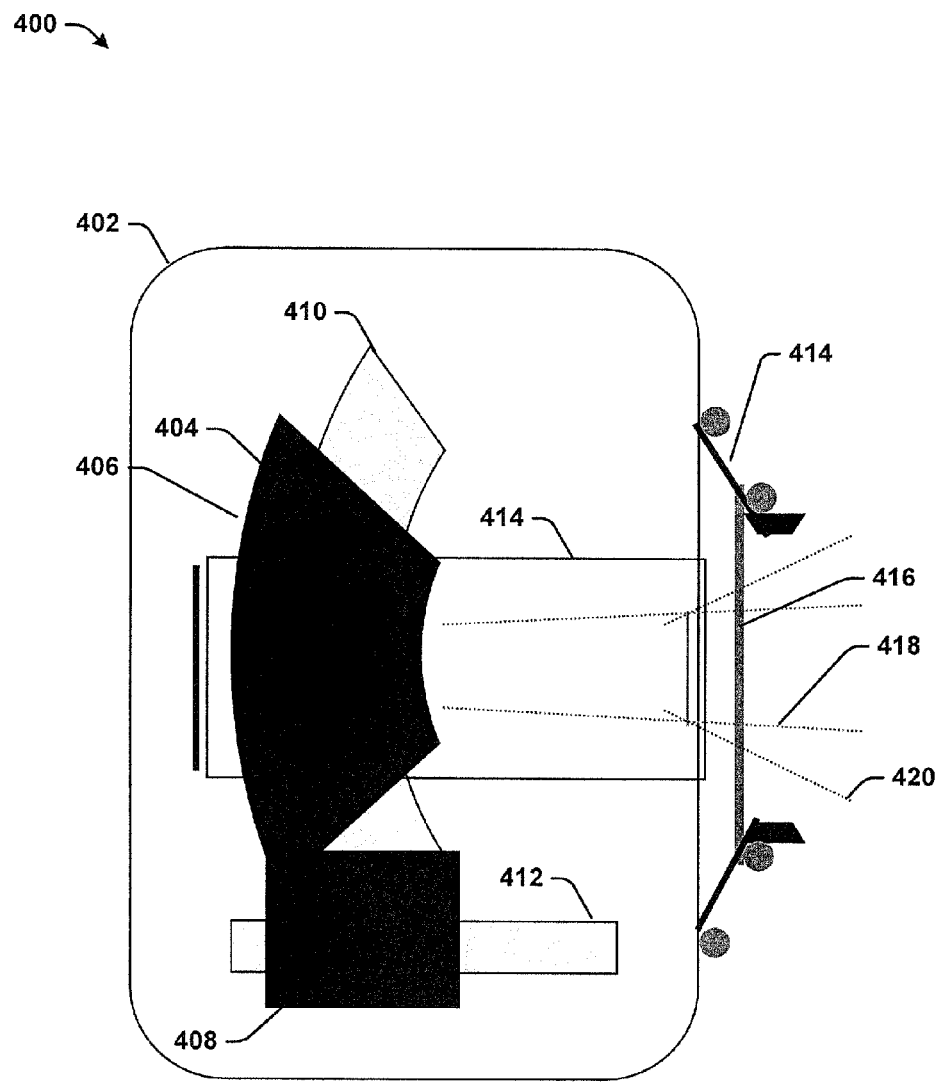
FIG. 4 is a block diagram illustrating another example, non-limiting embodiment of a pointing mechanism in a camera in accordance with various aspects described herein.

Turning now to FIG. 4, illustrated is another example, non-limiting embodiment 400 of a pointing mechanism in a camera 402 in accordance with various aspects described herein. The figure shown in FIG. 4 is shown from a side perspective.

In an embodiment, the camera 402 can include a curved tilt track 410 that provides guidance for the tilt motion of the camera 402. The tilt track 410 can be mounted to a base unit 408 that pans along pan track 412. The tilt track 410 can be semicircle in shape and the imaging device holder 406 which holds the imaging device 414 can be mounted to the tilt track 410. As the imaging device holder 406 moves along the tilt track 410, the imaging device 414 can capture images with a different field of view.

The imaging device holder 406 can surround the tilt track 410 and/or move along the tilt track 410 using wheels or cogs. The imaging device holder 406 can include a motor 404 that propels the imaging device holder 406 along the tilt track 410. The imaging device 414 can include an image sensor and a set of lenses which can provide focus and zoom capabilities for the camera 402.

The dotted line 418 represent the current field of view of the imaging device 414 while the dotted line 420 represent the potential field of view of the imaging device 414 based on the position of the base unit along the tilt track 410.

A front lens or glass covering 416 provides protection for the inside of the camera 402 and can also be part of the optical system that provides functionality for the focusing and zooming of the imaging device 414. The front lens or glass covering 416 can be slight recessed behind a leading edge of the bezel 414. The bezel 414 can be sloped and provide a surface on which the chain-link fence rests.

Figure 5:
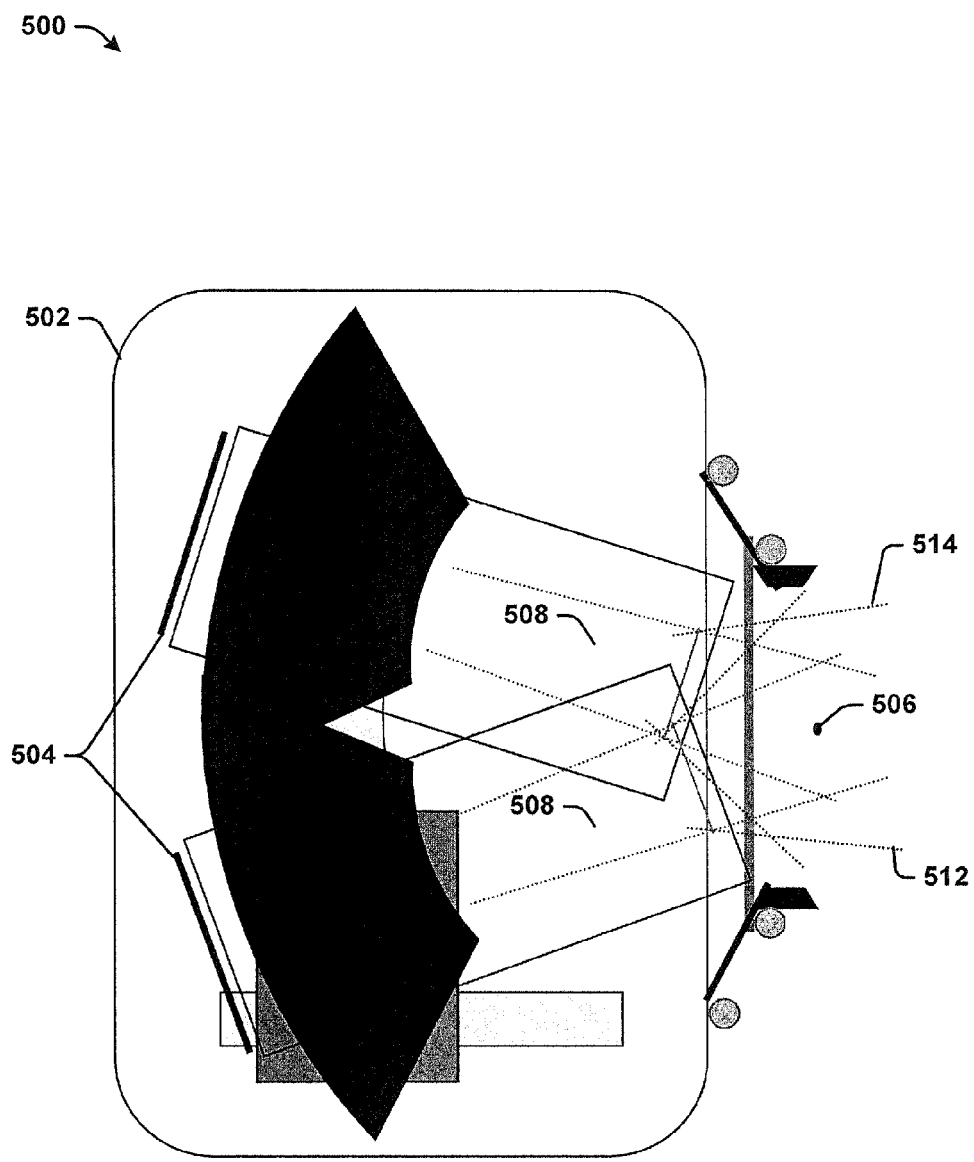
FIG. 5 is a block diagram illustrating another example, non-limiting embodiment of a pointing mechanism in operation in a camera in accordance with various aspects described herein.

Turning now to FIG. 5, illustrated is another example, non-limiting embodiment 500 of a pointing mechanism in operation in a camera 502 in accordance with various aspects described herein. FIG. 5 depicts camera 502 from the same side perspective as shown in FIG. 4. In FIG. 5 the imaging device holder 504 is shown in different positions at different tilt angles. The fields of view of the imaging device are shown by ray tracings 514 and 512, corresponding to the upper position of the imaging device holder 504 and the lower position of the imaging device holder 504 respectively.

The imaging device holder 504 moves along the tilt track, such that the axis of rotation 506 is in front of the base imaging device 508. The axis of rotation 506 can be in different locations in different embodiments based on the curvature of the tilt track and the location of the tilt track in the camera 502. In some embodiments, the axis of rotation 506 can sometimes be within the camera 502 itself in some embodiments. In other embodiments, the curvature of the tilt track may not be an even semi-circle, and thus the axis of rotation 506 may be not be a point location but may trace out a non-point area.

Figure 6:
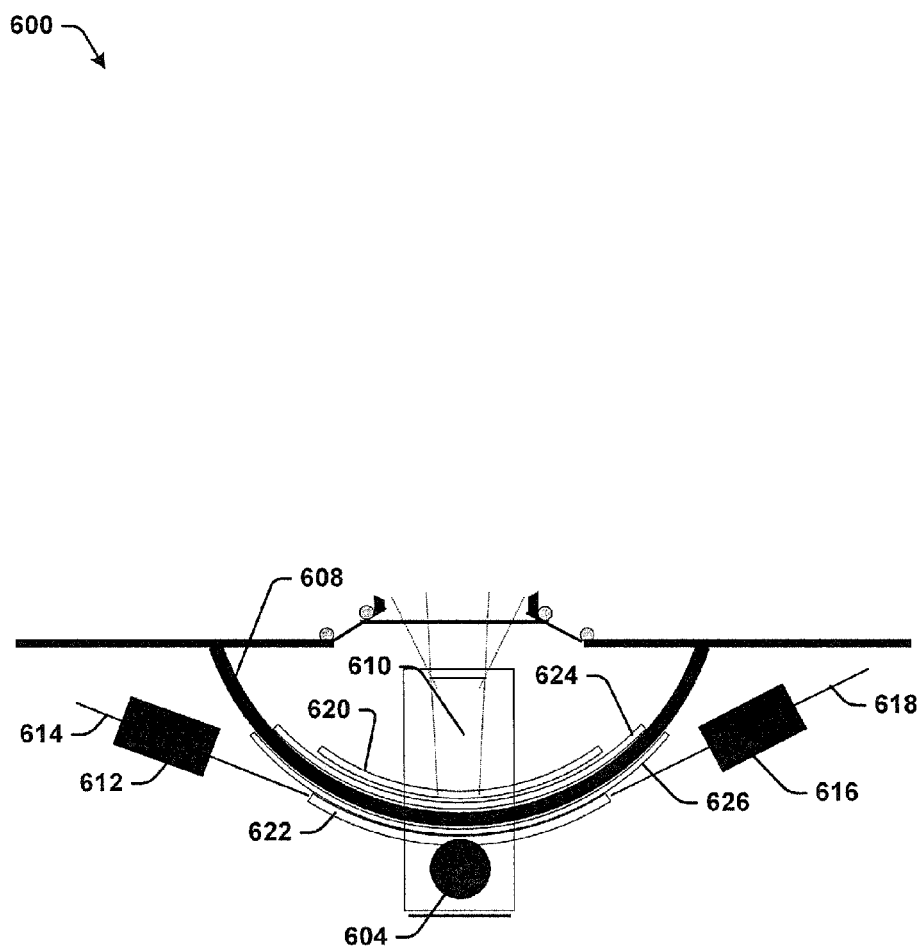
FIG. 6 is a block diagram illustrating another example, non-limiting embodiment of a pointing mechanism with linear actuators in a camera in accordance with various aspects described herein.

Turning now to FIG. 6, illustrated is an example, non-limiting embodiment 600 of a pointing mechanism with linear actuators in a camera in accordance with various aspects described herein. The figure shown in FIG. 6 is shown from a top down perspective. In the embodiment shown in FIG. 6, the imaging device 610 can be panned and tilted using linear actuators 612, 616, and 604 instead of using curved tracks with motors that propel the imaging device up and down and sideways on the curved tracks.

In this embodiment, a half sphere 608 can be formed in the camera, and an imaging device 610 can be mounted on the semi-sphere 608 and travel around the semi-sphere 608 to change the field of view of the imaging device 610. The semi-sphere 608 can have hole in the middle through which the imaging device 610 can view objects in the field of view. In an embodiment, the image sensor can be placed on the rear (bottom) of the semi-sphere 608 while lenses and other optics can be placed in front (top) of the semi-sphere 608, with the image sensor and optics on opposite sides of the opening in semi-sphere 608.

A spherical bracket 620 can be attached to the lenses/optics in front of the semi-sphere 608, and a second spherical bracket 622 is attached to the lens on the rear or internal side of the semi-sphere 608. Both brackets 620 and 622 can be firmly attached to the lens and move as one, forcing the lens to follow the spherical path defined by the semi-sphere 608. Independent and floating spherical gaskets 624 and 626 are also included to allow a full range of pan, tilt, and rotate motion. Inside the camera, 2 or more linear actuators 612 and 616 are mounted in such a manner that their linear arms 614 and 618, respectively, can be attached to a fixed point on the imaging device 610 or on spherical bracket 622. By installing 2 linear actuators, the camera lens can be made to pan or tilt. By installing 3 (such as with linear actuator 604 included) or more the imaging device 610 can be made to pan, tilt, or rotate.

Figure 7:
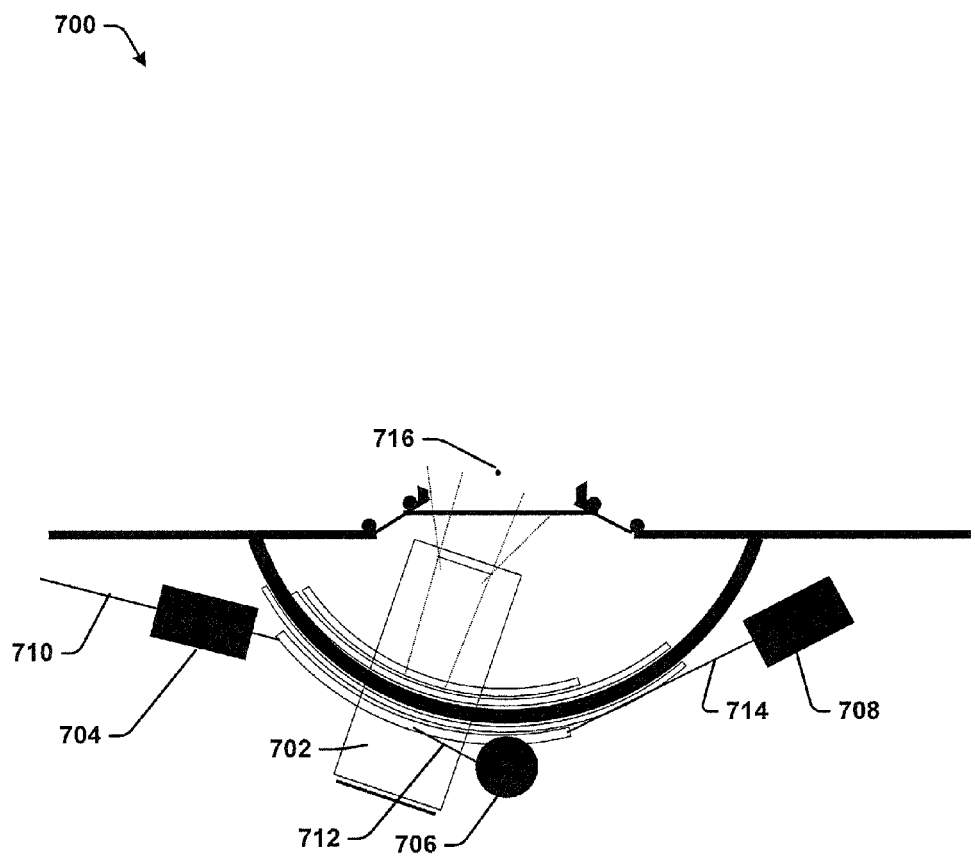
FIG. 7 is a block diagram illustrating another example, non-limiting embodiment of a pointing mechanism with linear actuators in operation in a camera in accordance with various aspects described herein.

Turning now to FIG. 7, illustrated is another example, non-limiting embodiment 700 of a pointing mechanism with linear actuators in operation in a camera in accordance with various aspects described herein. As can be seen in FIG. 7, the imaging device 702 has been shifted by the linear actuators 704, 706, and 708 with actuator arm 710 retracted linear actuator 704, and actuator arms 712 and 714 extended by linear actuators 706 and 708 respectively. Due to the motion of the actuator arms 710, 712, and 714, the imaging device 702 can be moved around on the spherical mound around an axis of rotation 716.

The axis of rotation 716 can be in different locations in different embodiments based on the curvature and size of the semi-spherical mound. In some embodiments, the axis of rotation 716 can sometimes be within the camera itself in some embodiments. In other embodiments, the curvature of the semi-spherical mount may not be an even semi-circle, and thus the axis of rotation 716 may be not be a point location but may trace out a non-point area.

Figure 8:
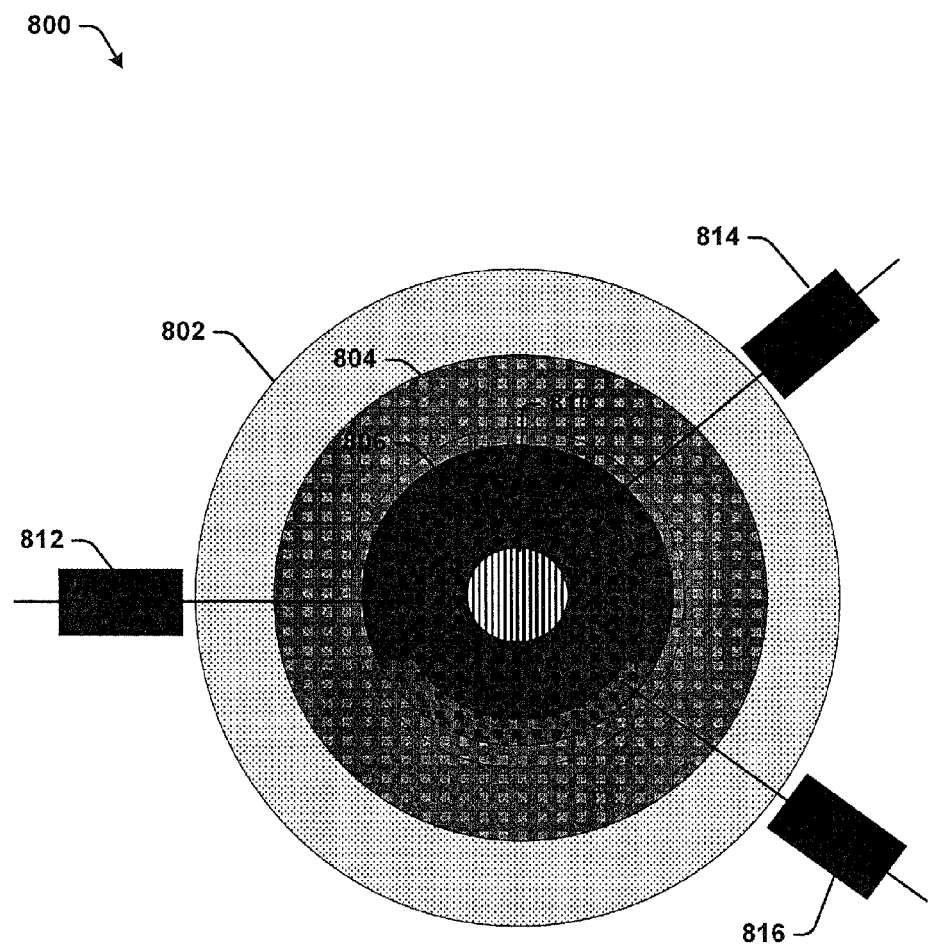
FIG. 8 is a block diagram illustrating another example, non-limiting embodiment of a pointing mechanism with linear actuators in a camera in accordance with various aspects described herein.

Turning now to FIG. 8. Illustrated is another example, non-limiting embodiment 800 of a pointing mechanism with linear actuators in a camera in accordance with various aspects described herein. FIG. 8 shows the same embodiment as that of FIG. 6 but from inside the camera behind the spherical dome 802. The imaging device 810 can be mounted to a spherical bracket 806 which has a counterpart on the other side of the spherical dome 802 (bracket 620 in FIG. 6). This lens and shell assembly is fixed onto a larger partial spherical dome shell 802 which is rigidly mounted to the camera case. Floating between these two brackets is a third spherical dome shell 804, and a counterpart not shown (624 in FIG. 6) which float freely and act as a gasket between the rigid shell 802 and the spherical brackets (806 and 620). The spherical bracket 806 is connected via small rods to linear actuators 812, 814, and 816. The linear actuators are electrically controlled motors that by pushing the rods can maneuver the spherical bracket 806 and thus the imaging device itself 810.

Figure 9:
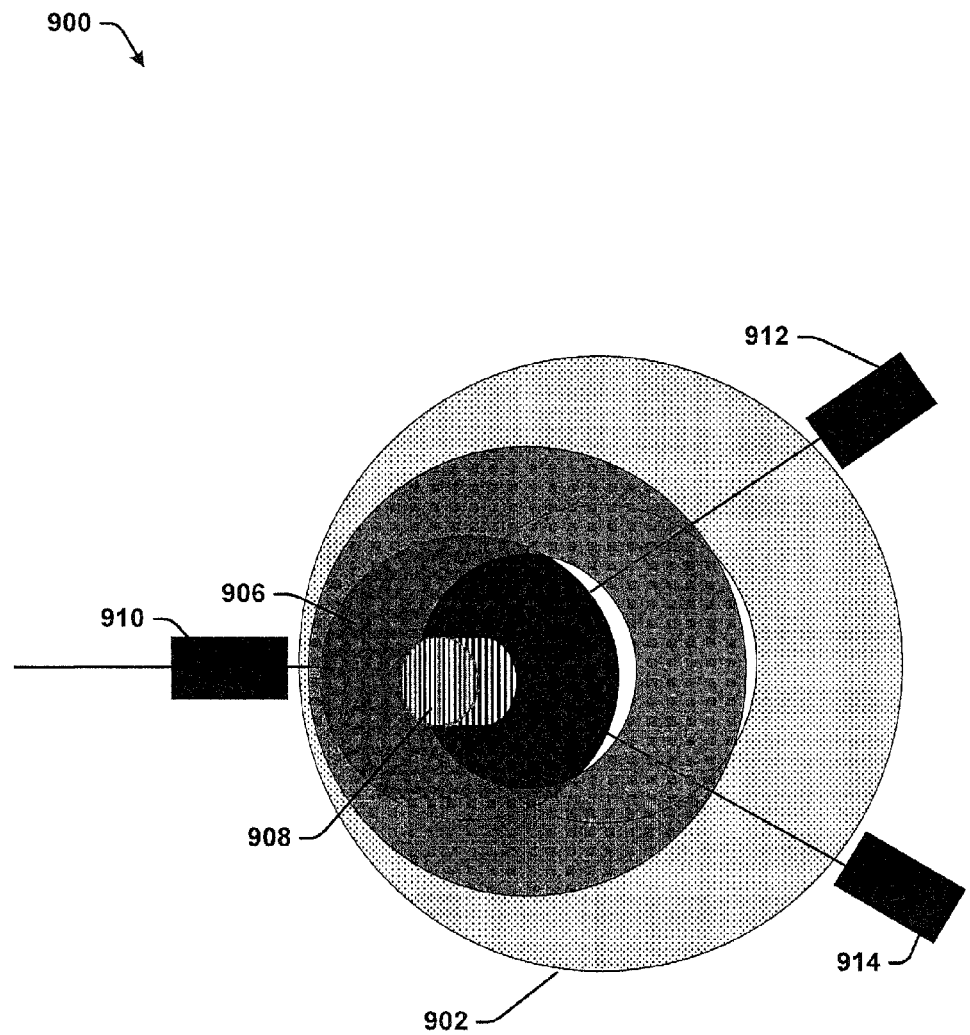
FIG. 9 is a block diagram illustrating another example, non-limiting embodiment of a pointing mechanism with linear actuators in operation in a camera in accordance with various aspects described herein.

FIG. 9 depicts the same embodiment as shown in FIG. 8, except that in embodiment 900 the linear actuators 910, 912, and 914 have retracted and/or extended their actuator arms, thus moving the spherical bracket 906 over the spherical mound 902 and repositioning the imaging device 908.

Figure 10:
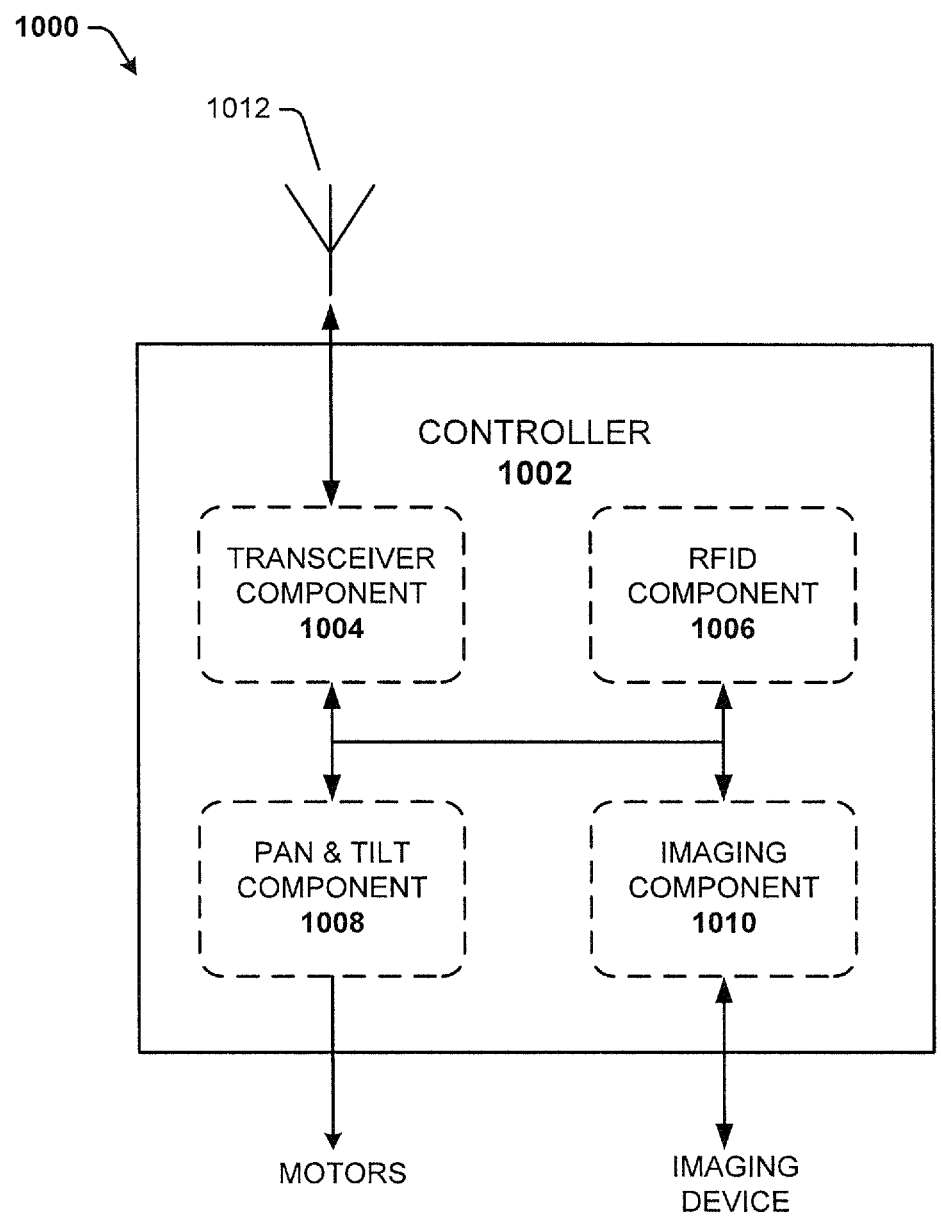
FIG. 10 is a block diagram illustrating an example, non-limiting embodiment of a controller system in accordance with various aspects described herein.

Turning now to FIG. 10, illustrated is a block diagram illustrating an example, non-limiting embodiment of a controller system 1000 in accordance with various aspects described herein. Controller system 1000 can include a controller 1002 that includes a transceiver component 1002 configured to facilitate communications with a mobile device via wireless antenna 1012. A pan and tilt component 1008 can facilitate operations of motors in the camera (e.g., track motors 210 and 212 or linear actuators 604, 612, and 616, etc) based on instructions received from the mobile device via transceiver component 1004. Imaging component 1010 can operate the imaging device (zoom, focus, set shutter speed, trigger shutter, record, etc) also based on instructions received via the transceiver component 1004. It can also analyze the incoming images from the imaging device, receive and analyze incoming meta-data from other cameras, create video analytics meta-data to be shared with other cameras, and compress the images for storage. A RFID component 1006 can read RFID tags that are nearby (e.g. by detected by a wireless antenna. The RFID component 1006 can also then send information stored in the RFID tag to other cameras and apparatuses that are located nearby via the transceiver component 1004.

In an embodiment, transceiver component 1004 can communicate with other apparatuses nearby. For instance, a mobile device may be controlling multiple imaging apparatuses, in order to focus on a particular event or object. Multiple cameras can be set up and the controllers on each apparatus (e.g., controller 1002) can communicate with each other to track the object and provide continuous coverage.

Figure 11:
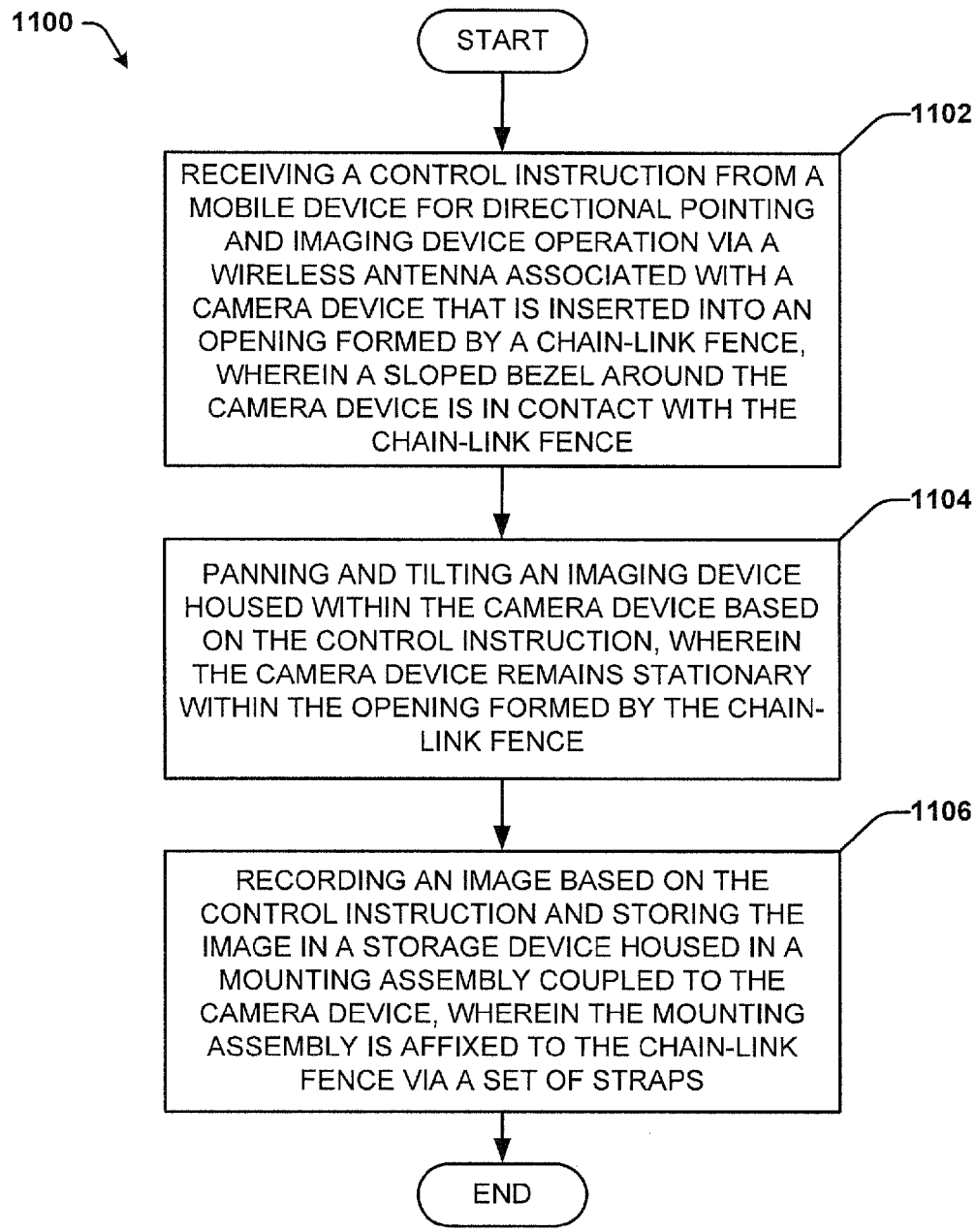
FIG. 11 illustrates a flow diagram of an example, non-limiting embodiment of a method for remote controlling a camera according to various aspects described herein.

FIG. 11 illustrates processes in connection with the aforementioned systems. The process in FIG. 11 can be implemented for example by systems 100-1000 illustrated in FIGS. 1-10 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 11 illustrates a flow diagram of an example, non-limiting embodiment of a method for operating a front-pivot motorized pan-tilt camera.

Method 1100 can start at 1102, where the method includes receiving a control instruction from a mobile device for directional pointing and imaging device operation via a wireless antenna associated with a camera device that is inserted into an opening formed by a chain-link fence, wherein a sloped bezel around the camera device is in contact with the chain-link fence. At 1104 the method includes, panning and tilting an imaging device housed within the camera device based on the control instruction, wherein the camera device remains stationary within the opening formed by the chain-link fence. At 1106 the method includes recording an image based on the control instruction and storing the image in a storage device housed in a mounting assembly coupled to the camera device, wherein the mounting assembly is affixed to the chain-link fence via a set of straps.

Example Networking Environment

Figure 12:
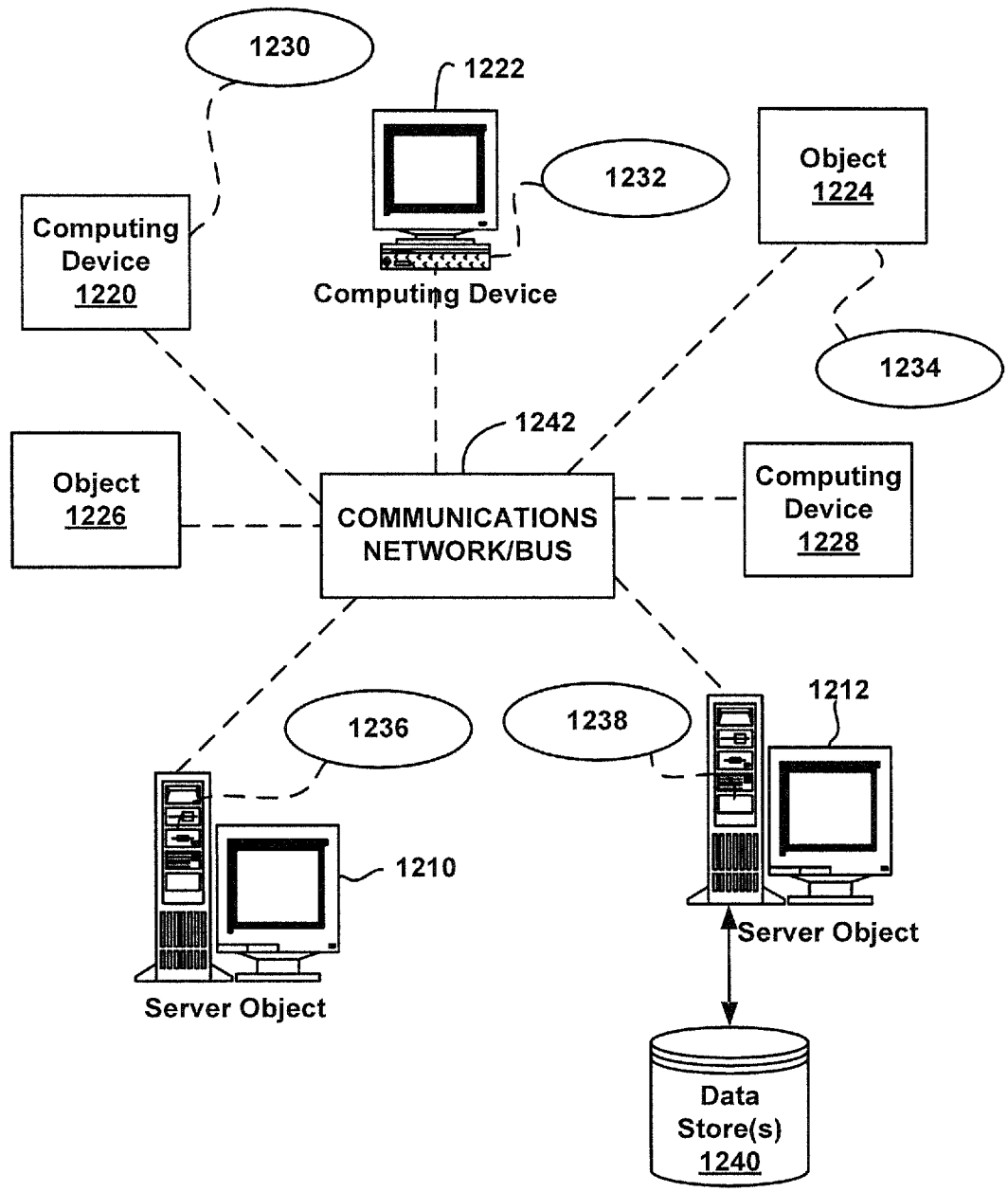
FIG. 12 illustrates a block diagram of an example electronic computing environment that can be implemented in conjunction with one or more aspects described herein.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include one or more cache memories, one or more registers, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Example Computing Environment

Figure 13:
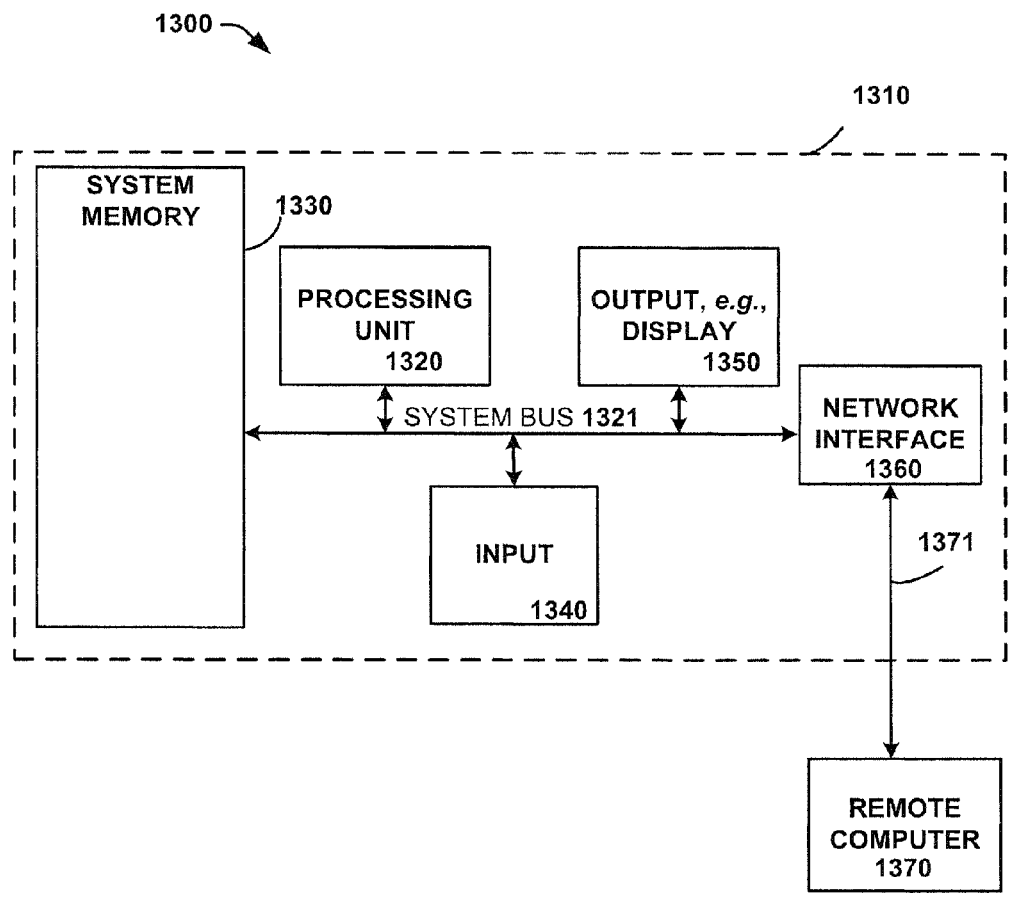
FIG. 13 illustrates a block diagram of an example data communication network that can be operable in conjunction with various aspects described herein.

As mentioned, advantageously, the techniques described herein can be applied to any device and/or network where power management is desirable in a multiprocessor system. It is to be understood, therefore, that handheld, portable and other computing devices and computing objects of all kinds are contemplated for use in connection with the various non-limiting embodiments, i.e., the controllers 516, 528, and 702 as described herein. Accordingly, the below general purpose remote computer described below in FIG. 13 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 13 thus illustrates an example of a suitable computing system environment 1300 in which some aspects of the disclosed subject matter can be implemented, although as made clear above, the computing system environment 1300 is only one example of a suitable computing environment for a device and is not intended to suggest any limitation as to the scope of use or functionality of the disclosed subject matter. Neither should the computing environment 1300 be interpreted as having any dependency or requirement relating to any one or combination of components illustrated in the exemplary operating environment 1300.

With reference to FIG. 13, an exemplary device for implementing the disclosed subject matter includes a general-purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures.

Computer 1310 typically includes a variety of computer readable media. Computer readable media can be any available media that can be accessed by computer 1310. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media typically embodies computer readable instructions, data structures, program modules, or other data in a modulated data signal such as a carrier wave or other transport mechanism and includes any information delivery media.

The system memory 1330 may include computer storage media in the form of volatile and/or nonvolatile memory such as read only memory (ROM) and/or random access memory (RAM). A basic input/output system (BIOS), containing the basic routines that help to transfer information between elements within computer 1310, such as during start-up, may be stored in memory 1330. Memory 1330 typically also contains data and/or program modules that are immediately accessible to and/or presently being operated on by processing unit 1320. By way of example, and not limitation, memory 1330 may also include an operating system, application programs, other program modules, and program data.

The computer 1310 may also include other removable/non-removable, volatile/nonvolatile computer storage media. For example, computer 1310 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1321 through a non-removable memory interface such as an interface, and a magnetic disk drive or optical disk drive is typically connected to the system bus 1321 by a removable memory interface, such as an interface.

A user can enter commands and information into the computer 1310 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1320 through user input 1340 and associated interface(s) that are coupled to the system bus 1321, but may be connected by other interface and bus structures, such as a parallel port, game port, or a universal serial bus (USB). A graphics subsystem can also be connected to the system bus 1321. A projection unit in a projection display device, or a HUD in a viewing device or other type of display device can also be connected to the system bus 1321 via an interface, such as output interface 1350, which may in turn communicate with video memory. In addition to a monitor, computers can also include other peripheral output devices such as speakers which can be connected through output interface 1350.

The computer 1310 can operate in a networked or distributed environment using logical connections to one or more other remote computer(s), such as remote computer 1370, which can in turn have media capabilities different from device 1310. The remote computer 1370 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1310. The logical connections depicted in FIG. 13 include a network 1371, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1310 can be connected to the LAN 1371 through a network interface or adapter. When used in a WAN networking environment, the computer 1310 can typically include a communications component, such as a modem, or other means for establishing communications over the WAN, such as the Internet. A communications component, such as wireless communications component, a modem and so on, which can be internal or external, can be connected to the system bus 1321 via the user input interface of input 1340, or other appropriate mechanism. In a networked environment, program modules depicted relative to the computer 1310, or portions thereof, can be stored in a remote memory storage device. It will be appreciated that the network connections shown and described are exemplary and other means of establishing a communications link between the computers can be used.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A front-pivot motorized pan-tilt camera, comprising:
   a camera device comprising a lens and a sloped bezel, the sloped bezel formed surrounding the lens and configured to be inserted into an opening formed by a chain-link fence, wherein the sloped bezel is in contact with the chain-link fence;
   a mounting assembly, affixed to the camera device, configured to attach to the chain-link fence using a plurality of straps, wherein the mounting assembly attaches to a side of the chain-link fence opposite a side of the chain-link fence associated with a field of view of an imaging device in the camera device, the sloped bezel, in contact with the chain-link fence, affixes the camera device to the opening; and
   a pointing mechanism configured to pan and tilt the imaging device within the camera device so that the field of view can be adjusted, wherein the camera device remains stationary within the opening of the chain-link fence.

2. The front-pivot motorized pan-tilt camera of claim 1, further comprising:
   a controller that provides instructions to the pointing mechanism to pan and tilt the imaging device and facilitate operation of the imaging device in response to instructions received wirelessly via a wireless antenna.

3. The front-pivot motorized pan-tilt camera of claim 2, wherein the controller provides instructions to the pointing mechanism based on a preprogrammed set of rules or based on autonomous analysis of a captured image.

4. The front-pivot motorized pan-tilt camera of claim 3, wherein the controller sends data associated with a result of the autonomous analysis to another camera device by a wireless transmission sent via the wireless antenna.

5. The apparatus of claim 1, wherein the plurality of straps include hooks that can be attached to the chain-link fence.

6. The front-pivot motorized pan-tilt camera of claim 1, wherein the pointing mechanism rotates the imaging device around an axis of rotation that is in front of the imaging device.

7. The front-pivot motorized pan-tilt camera of claim 1, wherein the sloped bezel is in contact with the chain-link fence on four sides of the camera device, and wherein the sloped bezel provides for insertion of the camera device into chain-link fence openings of various sizes.

8. The front-pivot motorized pan-tilt camera of claim 1, wherein at least one of the camera device or the mounting assembly houses a battery compartment that provides power to the camera device, and a storage device that stores images captured by the imaging device.

9. The front-pivot motorized pan-tilt camera of claim 1, wherein the pointing mechanism pans and tilts the imaging device using a set of curved rails and a set of electric motors that move the imaging device along the curved rails.

10. The front-pivot motorized pan-tilt camera of claim 1, wherein the pointing mechanism pans and tilts the imaging device using a set of linear actuators that move the imaging device around a semi-spherical mounting.

11. A method for operating a front-pivot motorized pan-tilt camera, comprising:
receiving a control instruction from a mobile device for directional pointing and imaging device operation via a wireless antenna associated with a camera device, wherein the camera device has a lens and a sloped bezel formed surrounding the lens, the sloped bezel inserted into an opening formed by a chain-link fence, and contacting the chain-link fence;
panning and tilting an imaging device housed within the camera device based on the control instruction, wherein the camera device remains stationary within the opening formed by the chain-link fence; and
recording an image based on the control instruction and storing the image in a storage device housed in a mounting assembly coupled to the camera device, wherein the mounting assembly is affixed to the chain-link fence via a set of straps.

12. The method of claim 11, wherein the panning and tilting the imaging device is based on a preprogrammed set of rules or based on autonomous analysis of a captured image.

13. The method of claim 11, wherein the panning and tilting the imaging device comprises rotating the imaging device around one or more axes of rotation in front of the imaging device.

14. The method of claim 11, further comprising:
facilitating the panning and tilting the imaging device using a set of curved rails and a set of electric motors that move the imaging device along the curved rails.

15. The method of claim 11, further comprising:
facilitating the panning and tilting the imaging device using a set of linear actuators that move the imaging device around a semi-spherical mounting.

16. A front-pivot motorized pan-tilt camera system, comprising:
a processor; and
a memory that stores executable instructions that, when executed by the processor, facilitate performance of operations, comprising:
receiving a control instruction from a mobile device for directional pointing and imaging device operation via a wireless antenna associated with a camera device,
the camera device having a lens and a sloped bezel formed surrounding the lens, wherein the sloped bezel is inserted into an opening formed by a chain-link fence and held in place by a mounting assembly affixed to the chain-link fence via a set of straps, wherein the sloped bezel of the camera device is affixed to the opening and in contact with the chain-link fence;
panning and tilting an imaging device housed within the camera device based on the control instruction, wherein the camera device remains stationary within the opening formed by the chain-link fence; and
recording an image based on the control instruction and storing the image in a storage device.

17. The front-pivot motorized pan-tilt camera system of claim 16, wherein the panning and tilting the imaging device comprises rotating the imaging device around one or more axes of rotation in front of the imaging device.

18. The front-pivot motorized pan-tilt camera system of claim 16, wherein the operations further comprise: panning and tilting the imaging device using a set of curved rails and a set of electric motors that move the imaging device along the curved rails.

19. The front-pivot motorized pan-tilt camera system of claim 16, wherein the operations further comprise:
panning and tilting the imaging device using a set of linear actuators that move the imaging device around a semi-spherical mounting.

20. The front-pivot motorized pan-tilt camera system of claim 16, wherein the operations further comprise:
performing image analysis on a stored image and generating a second control instruction for directional pointing and imaging device operation for another camera device; and
transmitting the second control instruction to the other camera device via the wireless antenna.

* * * * *